US012736185B2

(12) United States Patent
Lee et al.

(10) Patent No.: US 12,736,185 B2
(45) Date of Patent: Sep. 15, 2026

(54) REFRIGERANT CHARGING SYSTEM FOR RELIQUEFACTION SYSTEM FOR SHIP

(71) Applicant: HANWHA OCEAN CO., LTD., Geoje-Si (KR)

(72) Inventors: Joon Chae Lee, Seoul (KR); Won Jae Choi, Siheung-si (KR); Seung Chul Lee, Seoul (KR); Jin Ho Choi, Incheon (KR); Hye Min Jung, Geoje-si (KR); Zie Hyun Kim, Yongin-si (KR); Hyun Jun Shin, Seoul (KR)

(73) Assignee: Hanwha Ocean Co., Ltd., Geoje-Si (KR)

( * ) Notice: Subject to any disclaimer, the term of this patent is extended or adjusted under 35 U.S.C. 154(b) by 217 days.

(21) Appl. No.: 18/700,096

(22) PCT Filed: Dec. 27, 2021

(86) PCT No.: PCT/KR2021/019902
§ 371 (c)(1),
(2) Date: Apr. 10, 2024

(87) PCT Pub. No.: WO2023/068449
PCT Pub. Date: Apr. 27, 2023

(65) Prior Publication Data

US 2024/0344665 A1 Oct. 17, 2024

(30) Foreign Application Priority Data

Oct. 22, 2021 (KR) ........................ 10-2021-0141750

(51) Int. Cl.
*F17C 9/02* (2006.01)
*B63B 17/00* (2006.01)
*B63J 2/12* (2006.01)

(52) U.S. Cl.
CPC ............ *F17C 9/02* (2013.01); *B63B 17/0027* (2013.01); *B63J 2/12* (2013.01); *B63J 2002/125* (2013.01);
(Continued)

(58) Field of Classification Search
CPC ..... F25B 2345/001; F25B 45/00; F25J 1/001; F25J 1/0025; F25J 1/004; F25J 1/005;
(Continued)

(56) References Cited

U.S. PATENT DOCUMENTS 9,360,161 B2 * 6/2016 Barker ...................... F17C 9/02
10,940,424 B2 * 3/2021 Sinatov .................. F25J 1/0202
(Continued)

FOREIGN PATENT DOCUMENTS

JP H 11-105784 A 4/1994
JP 3022396 U 3/1996
(Continued)

OTHER PUBLICATIONS

Machine Translation of KR101480253, description (Year: 2015).*
(Continued)

*Primary Examiner* — Filip Zec
(74) *Attorney, Agent, or Firm* — Knobbe, Martens, Olson & Bear, LLP

(57) ABSTRACT

A refrigerant charging system includes: a reliquefaction system reliquefying boil-off gas generated in a liquefied gas storage tank by compressing the boil-off gas and subjecting the compressed boil-off gas to heat exchange with refrigerant supplied to a heat exchanger while circulating along a refrigerant circulation line; a buffer tank storing utility $N_2$ to be supplied to the ship; a booster compressor receiving the utility $N_2$ from the buffer tank, compressing the received $N_2$, and supplying the compressed $N_2$ to the refrigerant circulation line; and a first load-up line along which the $N_2$ is
(Continued)

supplied from the buffer tank to the refrigerant circulation line without passing through the booster compressor. Upon initial charging in a non-operation state of the reliquefaction system, the refrigerant circulation line is charged with refrigerant by supplying the $N_2$ from by a pressure differential between the refrigerant circulation line and the buffer tank.

7 Claims, 2 Drawing Sheets

(52) U.S. Cl.
CPC *F17C 2205/0352* (2013.01); *F17C 2221/014* (2013.01); *F17C 2221/033* (2013.01); *F17C 2227/0157* (2013.01); *F17C 2227/0341* (2013.01); *F17C 2265/033* (2013.01); *F17C 2270/0105* (2013.01)

(58) Field of Classification Search
CPC ........ F25J 1/0072; F25J 1/0204; F25J 1/0249; F25J 1/025; F25J 1/0277; F25J 1/0288; F25J 2210/90; F25J 2230/30; F17C 13/00; F17C 2205/0352; F17C 2221/014; F17C 2221/033; F17C 2227/0157; F17C 2227/0341; F17C 2265/033; F17C 2270/0105; F17C 6/00; F17C 9/02; F17C 2221/032
See application file for complete search history.

(56) References Cited

U.S. PATENT DOCUMENTS 11,243,026 B2 * 2/2022 Clodic ...................... F17C 5/02
2006/0053806 A1 * 3/2006 Tassel ...................... F17C 9/04 62/48.1
2008/0308175 A1 * 12/2008 Lee ...................... F17C 13/021 141/11
2013/0180282 A1 * 7/2013 Palmer ...................... F25J 1/004 62/611
2013/0192297 A1 * 8/2013 Mak ...................... F25J 1/005 62/611
2014/0053600 A1 * 2/2014 Jung ...................... F25J 1/0025 62/611
2016/0215930 A1 7/2016 Nelson et al.
2017/0051969 A1 * 2/2017 Clodic ...................... F25J 1/004
2017/0350632 A1 * 12/2017 Hirao ...................... F25J 1/0269
2018/0216876 A1 * 8/2018 Kim ...................... F25J 1/0245
2019/0063265 A1 * 2/2019 Sinatov ...................... F01K 27/02
2020/0393196 A1 * 12/2020 Cho ...................... F25J 1/023
2021/0164728 A1 * 6/2021 Borisevich ............ F17C 13/004
2024/0417037 A1 * 12/2024 Park ...................... F25J 1/0045

FOREIGN PATENT DOCUMENTS

KR 10-1480253 B1 1/2015
KR 10-2015-0033279 A 4/2015
KR 10-1799695 B1 11/2017
KR 10-2019-0064785 A 6/2019
KR 10-2020-0101063 A 8/2020
KR 10-2020-0112050 A 10/2020
WO WO 2017-037809 A1 3/2017

OTHER PUBLICATIONS

Machine Translation of WO2017037809, description (Year: 2017).*
Office Action in Japanese Application No. 2024-519521 dated Feb. 25, 2025.
International Search Report and Written Opinion for International PCT Application No. PCT/KR2021/019902 dated Oct. 28, 2022 in 9 pages [ISR Translated to English].
Notice of Allowance for KR10-2021-0141750 dated Oct. 10, 2023, in 6 pages.
Extended European Search Report in European Application No. 21961536.6 dated Oct. 7, 2025.

* cited by examiner

REFRIGERANT CHARGING SYSTEM FOR RELIQUEFACTION SYSTEM FOR SHIP

TECHNICAL FIELD

The present invention relates to a refrigerant charging system for a reliquefaction system for ships and, more particularly, to a refrigerant charging system that charges refrigerant circulated through a system for re-liquefying boil-off gas generated in a ship.

BACKGROUND ART

Natural gas contains methane as a main component and has been attracting attention as an eco-friendly fuel that emits little or no environmental pollutants during combustion. Liquefied natural gas (LNG) is obtained by liquefying natural gas through cooling to about −163° C. under normal pressure and is suited to long-distance transportation by sea since it has a volume of about 1/600 that of natural gas in a gaseous state. Accordingly, natural gas is stored and transported as liquefied natural gas, which is easy to store and transport.

Since natural gas is liquefied at a cryogenic temperature of −163° C. under normal pressure, LNG storage tanks are typically insulated to maintain LNG in a liquid state. However, despite being insulated, such a storage tank is limited in ability to block external heat. Accordingly, due to external heat continuously transferred to the LNG storage tank, LNG stored in the LNG tank continues to evaporate naturally during transportation, causing generation of boil-off gas (BOG).

Continuous production of boil-off gas in the LNG storage tank increases the internal pressure of the LNG storage tank. If the internal pressure of the storage tank exceeds a predetermined safe pressure, this can cause an emergency situation such as rupture of the storage tank. Accordingly, there is a need to discharge boil-off gas from the storage tank using a safety valve. However, boil-off gas is a kind of LNG loss and is an important issue for transportation efficiency and fuel efficiency of LNG. Therefore, various methods are employed to handle boil-off gas generated in the LNG storage tank.

Recently, a method of using boil-off gas at a fuel demand site such as an engine of a ship, a method of reliquefying boil-off gas and returning the reliquefied boil-off gas to an LNG storage tank, and a method combining these two approaches have been developed and put into use.

DISCLOSURE

Technical Tasks

In a reliquefaction cycle for reliquefaction of boil-off gas generated in a ship, typical available liquefaction methods include a process using a single mixed refrigerant (SMR) cycle and a process using a propane-precooled mixed refrigerant (C3MR) cycle. The C3MR cycle is a process in which natural gas is cooled using propane refrigerant alone and then is liquefied and subcooled using a mixed refrigerant, while the SMR cycle is a process in which natural gas is liquefied using a mixed refrigerant composed of multiple components.

As such, the SMR cycle and the C3MR cycle both use a mixed refrigerant. However, if the composition of the mixed refrigerant changes due to refrigerant loss during liquefaction of boil-off gas, this can lead to poor liquefaction efficiency. Accordingly, there is a need to maintain constant composition of the refrigerant by continuously measuring the composition of the mixed refrigerant and replenishing lacking refrigerant components.

An alternative reliquefaction cycle to reliquefy boil-off gas is a single-cycle liquefaction process using nitrogen refrigerant.

Despite relative inefficiency compared to a reliquefaction cycle using a mixed refrigerant, such a reliquefaction cycle using nitrogen refrigerant is safer due to inert properties of nitrogen refrigerant and is easier to apply to ships since nitrogen refrigerant undergoes no phase change. The reliquefaction cycle using nitrogen refrigerant also requires replenishment of nitrogen refrigerant since there can be a loss of nitrogen refrigerant as the liquefaction process progresses.

FIG. 1 is a schematic block diagram of a conventional refrigerant charging system for a reliquefaction system employing nitrogen refrigerant.

Ships with an LNG cargo hold are generally equipped with a nitrogen generation device to produce utility $N_2$ to be supplied to the ship, including nitrogen to be supplied to an insulation space in the cargo hold. Referring to FIG. 1, nitrogen generated through an air compressor 10 and an $N_2$ generator 20 is stored in a buffer tank 30 and is supplied as utility $N_2$ from the buffer tank to the ship. The refrigerant charging system also receives nitrogen from the buffer tank 30 and supplies the received nitrogen to a reliquefaction system RS.

The refrigerant charging system includes: a drying and filtration unit 40 receiving utility $N_2$ and reducing a dew point of the utility $N_2$; a booster compressor 50 compressing utility $N_2$; and an inventory tank 60 receiving the utility $N_2$ compressed by the booster compressor and storing the utility $N_2$.

In a refrigerant charging process from a state where the reliquefaction cycle is not in operation to a state where the reliquefaction cycle is in normal operation, while the reliquefaction cycle is not in operation, the refrigerant charging system receives utility $N_2$ from the buffer tank 30, allows the utility $N_2$ to pass through the drying and filtration unit 40, compresses the utility $N_2$ through the booster compressor 50, and supplies the compressed utility $N_2$ to the inventory tank 60.

Upon starting operation of the reliquefaction cycle, the reliquefaction system is gradually loaded up to a normal operation state while being continuously charged with refrigerant supplied from the inventory tank to a refrigerant circulation line of the reliquefaction system.

When the reliquefaction cycle reaches normal operation, the load of the reliquefaction cycle is regulated by charging the inventory tank with refrigerant from the reliquefaction system or discharging refrigerant from the inventory tank, depending on load requirements. Charging or discharging of refrigerant occurs between the inventory tank and the refrigerant circulation line, wherein the pressure in the inventory tank may be adjusted by charging the inventory tank 60 with additional nitrogen refrigerant supplied from the buffer tank 30 through the drying and filtration unit 40 and the booster compressor 50 or by discharging some nitrogen from the inventory tank to outside atmosphere depending on the situation in the inventory tank.

Upon load-down of the reliquefaction system, nitrogen refrigerant is discharged from the refrigerant circulation line to the inventory tank by a pressure differential between the refrigerant circulation line and the inventory tank. When it is difficult to discharge the nitrogen refrigerant from the refrigerant circulation by the pressure differential as the load of the reliquefaction system decreases to a certain level or less, nitrogen is sent to an upstream side of the booster compressor to be recompressed and is then delivered to the inventory tank. In addition, the conventional refrigerant charging system includes: a separate supply pipe to periodically replenish nitrogen in the reliquefaction cycle that is consumed by the compressor in the reliquefaction cycle; and a separate vent line to rapidly drain nitrogen refrigerant from the reliquefaction system in an emergency.

It is an aspect of the present invention to provide a solution that realizes a more compact and simplified refrigerant charging system through reduction in number of related devices while ensuring smooth charging or discharging of nitrogen refrigerant required for the reliquefaction system.

Technical Solution

In accordance with one aspect of the present invention, a refrigerant charging system for a reliquefaction system for ships includes:

- a reliquefaction system provided to a ship and reliquefying boil-off gas generated in a liquefied gas storage tank by compressing the boil-off gas and subjecting the compressed boil-off gas to heat exchange with refrigerant supplied to a heat exchanger while circulating along a refrigerant circulation line;
- a buffer tank storing utility $N_2$ to be supplied to the ship;
- a booster compressor receiving the utility $N_2$ from the buffer tank, compressing the received utility $N_2$, and supplying the compressed utility $N_2$ to the refrigerant circulation line; and
- a first load-up line along which the utility $N_2$ is supplied from the buffer tank to the refrigerant circulation line without passing through the booster compressor, wherein, upon initial charging in a non-operation state of the reliquefaction system, the refrigerant circulation line is charged with refrigerant by supplying the utility $N_2$ from the buffer tank to the refrigerant circulation line along the first load-up line by a pressure differential between the refrigerant circulation line and the buffer tank.

The refrigerant charging system may further include: a second load-up line along which the utility $N_2$ is supplied from the buffer tank to the refrigerant circulation line through the booster compressor, wherein, upon refrigerant charging for load-up of the reliquefaction system, the utility $N_2$ from the buffer tank is pressurized by the booster compressor along the second load-up line and is supplied to the refrigerant circulation line, when a pressure in the refrigerant circulation line is higher than or equal to a pressure in the buffer tank.

The refrigerant charging system may further include: a first load-down line connected from the refrigerant circulation line to the buffer tank and allowing the refrigerant to be discharged therealong; and a second load-down line connected from the refrigerant circulation line to the buffer tank through the booster compressor, wherein, upon load-down of the reliquefaction system, the refrigerant is discharged from the refrigerant circulation line along the first load-down line by a pressure differential between the refrigerant circulation line and the buffer tank, and the refrigerant in the refrigerant circulation line is returned to the buffer tank through the booster compressor along the second load-down line when a pressure in the buffer tank is higher than or equal to a pressure in the refrigerant circulation line.

The refrigerant circulation line may be provided with a refrigerant compressor compressing the refrigerant discharged from the heat exchanger after cooling the boil-off gas and an expander expanding and cooling the refrigerant compressed by the refrigerant compressor and having been cooled through the heat exchanger and supplying the cooled refrigerant to the heat exchanger, and, upon charging the refrigerant into the refrigerant circulation line, the utility $N_2$ is supplied from the buffer tank to an upstream side of the refrigerant compressor on the refrigerant circulation line and, upon load-down of the reliquefaction system, the refrigerant is discharged from a downstream side of the refrigerant compressor on the refrigerant circulation line to the buffer tank.

The buffer tank may be provided to a nitrogen generation device generating utility $N_2$ to be supplied to an insulation layer of the liquefied gas storage tank, supplied as seal gas for an onboard compressor, or supplied as refrigerant for the reliquefaction system.

The nitrogen generation device may further include: a nitrogen generator generating the utility $N_2$ from compressed air and delivering the generated utility $N_2$ to the buffer tank; and an air compressor compressing air and supplying the compressed air to the nitrogen generator.

The utility $N_2$ may be supplied from the buffer tank to the refrigerant circulation line without further drying the utility $N_2$ by disposing a dryer downstream of the nitrogen generator to reduce a dew point of the utility $N_2$ or by increasing water content-related specifications of the nitrogen generator.

Advantageous Effects

The present invention provides a refrigerant charging system that can reduce initial installation costs and can contribute to freeing up space in a ship by eliminating the need for separate devices, such as a dryer and an inventory tank for a refrigerant cycle.

In addition, the present invention realizes a more compact and simplified refrigerant charging system through reduction in number of related devices while ensuring smooth control over the load of a reliquefaction system by charging/discharging refrigerant into/from the reliquefaction system through effective utilization of existing devices.

EMBODIMENTS

Figure 1:
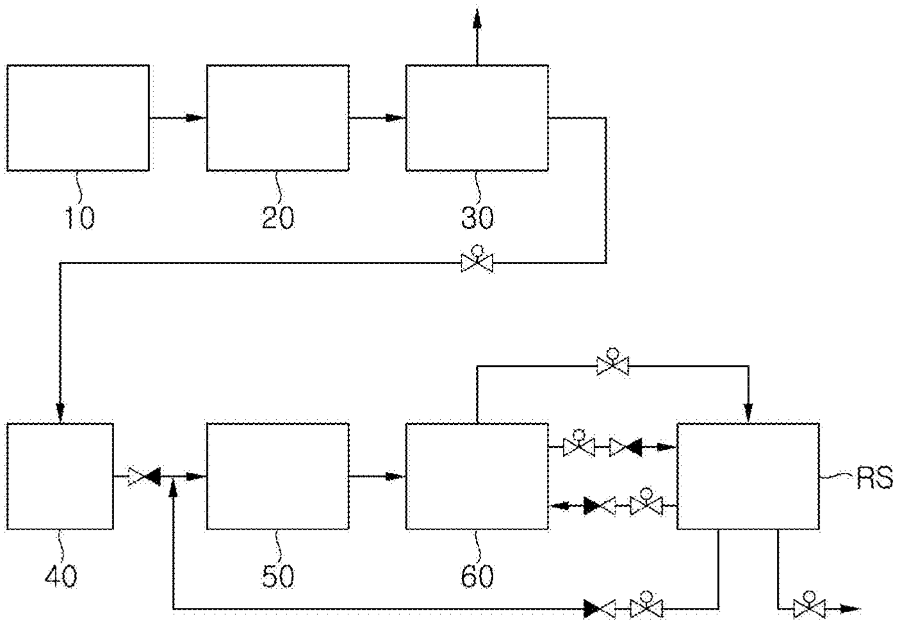
FIG. 1 is a schematic block diagram of a conventional refrigerant charging system for a reliquefaction system employing nitrogen refrigerant.

In order to fully appreciate the operational advantages of the present invention and the objectives achieved by practicing the present invention, reference should be made to the accompanying drawings, which illustrate preferred embodiments of the present invention, and description thereof.

Hereinafter, exemplary embodiments of the present invention will be described in detail in terms of the features and effects thereof with reference to the accompanying drawings. It should be noted that like components will be denoted by like reference numerals throughout the specification and the accompanying drawings.

As used herein, the term "ship" may refer to any type of ship that is provided with a liquefied gas storage tank. For example, the ship may include self-propelled vessels, such as an LNG carrier, a liquid hydrogen carrier, and an LNG regasification vessel (RV), as well as non-self-propelled floating offshore structures, such as an LNG floating production storage offloading (FPSO) unit and an LNG floating storage regasification unit (FSRU).

In addition, the embodiments of the present invention may be applied to a reliquefaction cycle for any type of liquefied gas that can be transported in a liquid state by liquefaction at cryogenic temperatures and can generate boil-off gas during storage. For example, such liquefied gas may include liquefied petrochemical gas, such as liquefied natural gas (LNG), liquefied ethane gas (LEG), liquefied petroleum gas (LPG), liquefied ethylene gas, and liquefied propylene gas. In the following embodiments, the present invention will be described using LNG, which is a typical liquefied gas, as an example.

Figure 2:
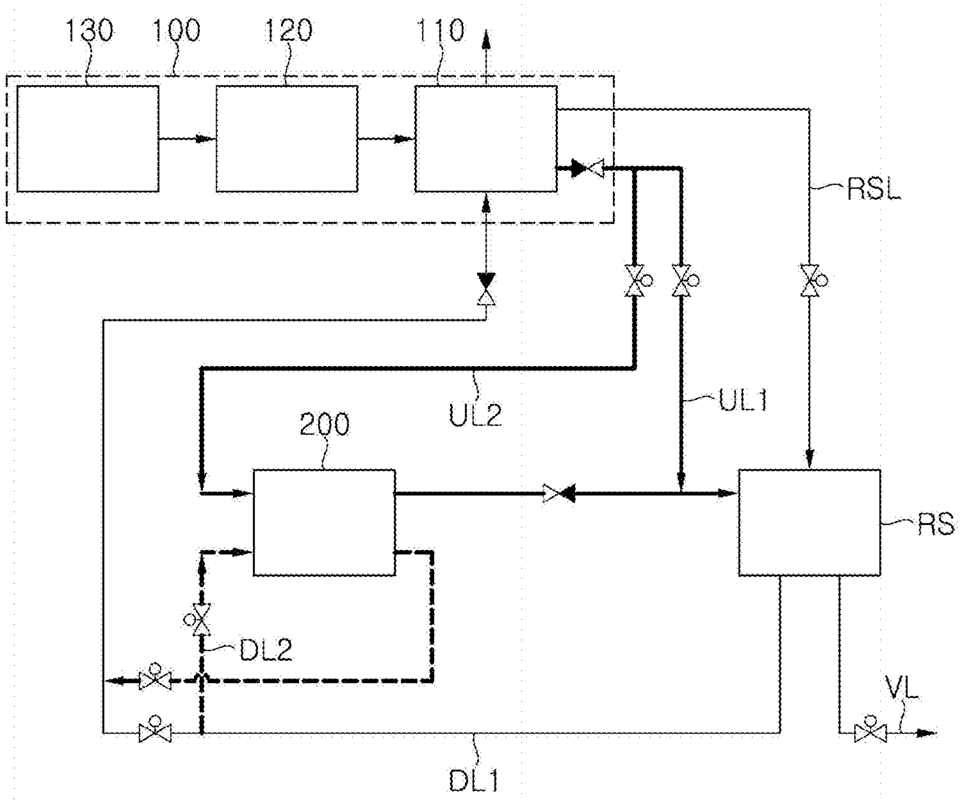
FIG. 2 is a schematic block diagram of a refrigerant charging system for a reliquefaction system for ships according to one embodiment of the present invention.

FIG. 2 is a schematic block diagram of a refrigerant charging system for a reliquefaction system for ships according to one embodiment of the present invention.

The refrigerant charging system according to this embodiment is intended to effectively charge refrigerant into a reliquefaction cycle of a reliquefaction system of a ship, that is, a refrigeration cycle, and to effectively replenish or discharge nitrogen refrigerant in response to changes in load of the reliquefaction cycle.

The reliquefaction system RS reliquefies boil-off gas generated from liquefied gas in a storage tank of the ship by compressing and cooling the boil-off gas and returns the reliquefied boil-off gas to the storage tank. The reliquefaction system RS includes a compressor (not shown) compressing boil-off gas, a heat exchanger (not shown) cooling the compressed boil-off gas, a gas-liquid separator separating the boil-off gas cooled and reliquefied through the heat exchanger into a gaseous phase and a liquid phase, and the like.

The refrigerant cycle (not shown) includes: a refrigerant circulation line (not shown) along which refrigerant supplied to the heat exchanger is circulated; a refrigerant compressor (not shown) disposed on the refrigerant circulation line and compressing the refrigerant discharged from the heat exchanger after cooling boil-off gas; and an expander (not shown) expanding and cooling the refrigerant compressed by the refrigerant compressor and having been cooled through the heat exchanger and supplying the cooled refrigerant to the heat exchanger. The refrigerant compressor and the expander may be connected to each other via a common shaft to form a compander that uses energy from expansion of refrigerant to compress the refrigerant.

For example, nitrogen ($N_2$) may be used as the refrigerant supplied to the heat exchanger while circulating along the refrigerant circulation line.

The refrigerant charging system according to this embodiment serves to supply nitrogen refrigerant circulated along the refrigerant circulation line to the refrigerant cycle of the reliquefaction system RS or to discharge the nitrogen refrigerant from the refrigerant cycle.

Referring to FIG. 2, the refrigerant charging system according to this embodiment includes: a buffer tank 110 storing utility $N_2$ to be supplied to the ship; a booster compressor 200 receiving the utility $N_2$ from the buffer tank, compressing the received utility $N_2$, and supplying the compressed utility $N_2$ to the refrigerant circulation line; a first load-up line UL1 along which the utility $N_2$ is supplied from the buffer tank to the refrigerant circulation line of the refrigerant cycle without passing through the booster compressor; and a second load-up line UL2 along which the utility $N_2$ is supplied from the buffer tank to the refrigerant circulation line through the booster compressor.

The buffer tank 110 is provided to a nitrogen generation device 100 generating and supplying utility $N_2$ required for the ship, wherein the nitrogen generation device 100 may include: a nitrogen generator 120 generating utility $N_2$ from compressed air and delivering the generated utility $N_2$ to the buffer tank; and an air compressor 130 compressing air and supplying the compressed air to the nitrogen generator. Nitrogen generated by the nitrogen generation device 100 may be supplied to an insulation layer of an LNG storage tank, supplied as seal gas for onboard compressors, or supplied as refrigerant for the reliquefaction system.

The utility $N_2$ stored in the buffer tank may be supplied to the refrigerant circulation line without further drying the utility $N_2$ by disposing a separate dryer downstream of the nitrogen generator 120 of the nitrogen generation device to lower a dew point of the utility $N_2$ or by increasing water content-related specifications of the nitrogen generator 120.

As the amount of boil-off gas discharged from the storage tank to be reliquefied changes, the amount of cold heat required for the reliquefaction system changes. Here, the amount of cold heat in the refrigerant circulation line and the load of the reliquefaction system may be controlled by changing a mass flow rate of refrigerant along the refrigerant circulation line through replenishment of refrigerant in the refrigerant cycle or through discharge of some refrigerant from the refrigerant circulation line while maintaining a ratio of compression work in the refrigerant compressor to expansion work in the expander at a fixed value without adjustment of a variable geometry nozzle (VGN) of the expander.

To this end, the first and second load-up lines UL1, UL2, along which refrigerant is supplied from the buffer tank 110 to the refrigerant circulation line, are connected to a low pressure section of the refrigerant circulation line, that is, to an upstream side of the refrigerant compressor (not shown), to replenish refrigerant in the refrigerant cycle.

In addition, the refrigerant charging system according to this embodiment further includes: a first load-down line DL1 connected from the refrigerant circulation line to the buffer tank and allowing the refrigerant to be discharged thereal-ong; and a second load-down line DL2 connected from the refrigerant circulation line to the buffer tank through the booster compressor. The first and second load-down lines are connected from a high-pressure section of the refrigerant circulation line, that is, from a downstream side of the refrigerant compressor, to the buffer tank 110 to discharge refrigerant from the refrigerant cycle to the buffer tank.

In the following, a refrigerant charging process by the refrigerant charging system according to this embodiment will be described in detail. First, upon initial charging in a non-operation state of the reliquefaction system, the refrigerant cycle is charged with refrigerant as utility $N_2$ is supplied from the buffer tank 110 to the refrigerant circulation line of the reliquefaction system RS along the first load-up line UL1 by a pressure differential between the refrigerant circulation line and the buffer tank.

When the refrigerant pressure in the refrigerant circulation line changes to a level similar to or higher than that in the buffer tank due to refrigerant charging, making it impossible to perform any further supply of refrigerant by the pressure differential, utility $N_2$ from the buffer tank is pressurized by the booster compressor 200 along the second load-up line UL2 and is then supplied to the refrigerant circulation line.

Upon refrigerant charging for load-up of the reliquefaction system due to increase in amount of cold heat required for the reliquefaction system, when the refrigerant pressure in the refrigerant circulation line is at a level similar to or higher than that in the buffer tank, utility $N_2$ from the buffer tank is pressurized by the booster compressor 200 along the second load-up line UL2 and is then supplied to the refrigerant circulation line to replenish refrigerant in the refrigerant circulation line.

Conversely, when the reliquefaction system is loaded down due to decrease in amount of cold heat required for the reliquefaction system, a mass flow rate of refrigerant along the refrigerant circulation line is reduced by discharging some refrigerant from a downstream side of the refrigerant compressor to the buffer tank 110 along the first load-down line DL1 by a pressure differential between the refrigerant circulation line and the buffer tank. When the pressure in the refrigerant circulation line changes to a level similar to that in the buffer tank due to refrigerant discharge, refrigerant in the refrigerant circulation line is sent to an upstream side of the booster compressor 200 along the second load-down line DL2 to be compressed by the booster compressor 200 and is then returned to the buffer tank 110.

During operation of the refrigerant cycle, nitrogen is consumed by the refrigerant compressor. To this end, a separate supply line RSL is provided to periodically supply nitrogen from the buffer tank to the refrigerant circulation line. In addition, a separate $N_2$ vent line VL is connected to the refrigerant circulation line of the refrigerant cycle to rapidly drain refrigerant from the reliquefaction system in an emergency.

As described above, the refrigerant charging system according to the present invention can reduce initial installation costs and can contribute to freeing up space in a ship by eliminating the need for separate devices, such as a dryer and an inventory tank for a refrigerant cycle, and can ensure smooth control over the load of the reliquefaction system by charging/discharging refrigerant into/from the reliquefaction system using a pressure differential between existing devices.

Although some embodiments have been described herein, the present invention is not limited to the above embodiments and may be practiced in various modifications or variations without departing from the technical spirit of the invention, as will be apparent to one of ordinary skill in the art to which the present invention pertains.

The invention claimed is:

1. A refrigerant charging system for a reliquefaction system for ships, comprising:

a reliquefaction system provided to a ship and configured to reliquefy boil-off gas generated in a liquefied gas storage tank by compressing the boil-off gas and subjecting the compressed boil-off gas to heat exchange with refrigerant supplied to a heat exchanger while circulating along a refrigerant circulation line;

a buffer tank configured to store utility $N_2$ to be supplied to the ship;

a booster compressor configured to receive the utility $N_2$ from the buffer tank, compress the received utility $N_2$, and supply the compressed utility $N_2$ to the refrigerant circulation line; and a first load-up line along which the utility $N_2$ is supplied from the buffer tank to the refrigerant circulation line without passing through the booster compressor, wherein, upon initial charging in a non-operation state of the reliquefaction system, the refrigerant circulation line is charged with refrigerant by supplying the utility $N_2$ from the buffer tank to the refrigerant circulation line along the first load-up line by a pressure differential between the refrigerant circulation line and the buffer tank, and wherein a load of the reliquefaction system is controllable by changing a mass flow rate of the refrigerant along the refrigerant circulation line through replenishment or partial discharge of the refrigerant.

2. The refrigerant charging system according to claim 1, further comprising:

a second load-up line along which the utility $N_2$ is supplied from the buffer tank to the refrigerant circulation line through the booster compressor, wherein, upon refrigerant charging for load-up of the reliquefaction system, the utility $N_2$ from the buffer tank is pressurized by the booster compressor along the second load-up line and is supplied to the refrigerant circulation line, when a pressure in the refrigerant circulation line is higher than or equal to a pressure in the buffer tank.

3. The refrigerant charging system according to claim 2, further comprising:

a first load-down line connected from the refrigerant circulation line to the buffer tank and configured to allow the refrigerant to be discharged therealong; and a second load-down line connected from the refrigerant circulation line to the buffer tank through the booster compressor, wherein, upon load-down of the reliquefaction system, the refrigerant is discharged from the refrigerant circulation line along the first load-down line by a pressure differential between the refrigerant circulation line and the buffer tank, and the refrigerant in the refrigerant circulation line is returned to the buffer tank through the booster compressor along the second load-down line when a pressure in the buffer tank is higher than or equal to a pressure in the refrigerant circulation line.

4. The refrigerant charging system according to claim 3, wherein the refrigerant circulation line comprises:

a refrigerant compressor configured to compress the refrigerant discharged from the heat exchanger after cooling the boil-off gas; and an expander configured to expand and cool the refrigerant compressed by the refrigerant compressor and having been cooled through the heat exchanger and supply the cooled refrigerant to the heat exchanger, and wherein upon charging the refrigerant into the refrigerant circulation line, the utility $N_2$ is supplied from the buffer tank to an upstream side of the refrigerant compressor on the refrigerant circulation line and, upon load-down of the reliquefaction system, the refrigerant is discharged from a downstream side of the refrigerant compressor on the refrigerant circulation line to the buffer tank.

5. The refrigerant charging system according to claim 1, wherein the buffer tank is provided to a nitrogen generation device configured to generate utility $N_2$ to be supplied to an insulation layer of the liquefied gas storage tank, supplied as seal gas for an onboard compressor, or supplied as refrigerant for the reliquefaction system.

6. The refrigerant charging system according to claim 5, wherein the nitrogen generation device further comprises:

a nitrogen generator configured to generate the utility $N_2$ from compressed air and deliver the generated utility $N_2$ to the buffer tank; and an air compressor configured to compress air and supply the compressed air to the nitrogen generator.

7. The refrigerant charging system according to claim 6, wherein the utility $N_2$ is supplied from the buffer tank to the refrigerant circulation line without further drying the utility $N_2$ by disposing a dryer downstream of the nitrogen generator to reduce a dew point of the utility $N_2$ or by increasing water content-related specifications of the nitrogen generator.

* * * * *